Oct. 30, 1934.  H. FRANKE  1,978,745
METHOD OF AND SYSTEM FOR TAKING X-RAY PHOTOGRAPHS
Filed March 7, 1930  3 Sheets-Sheet 1
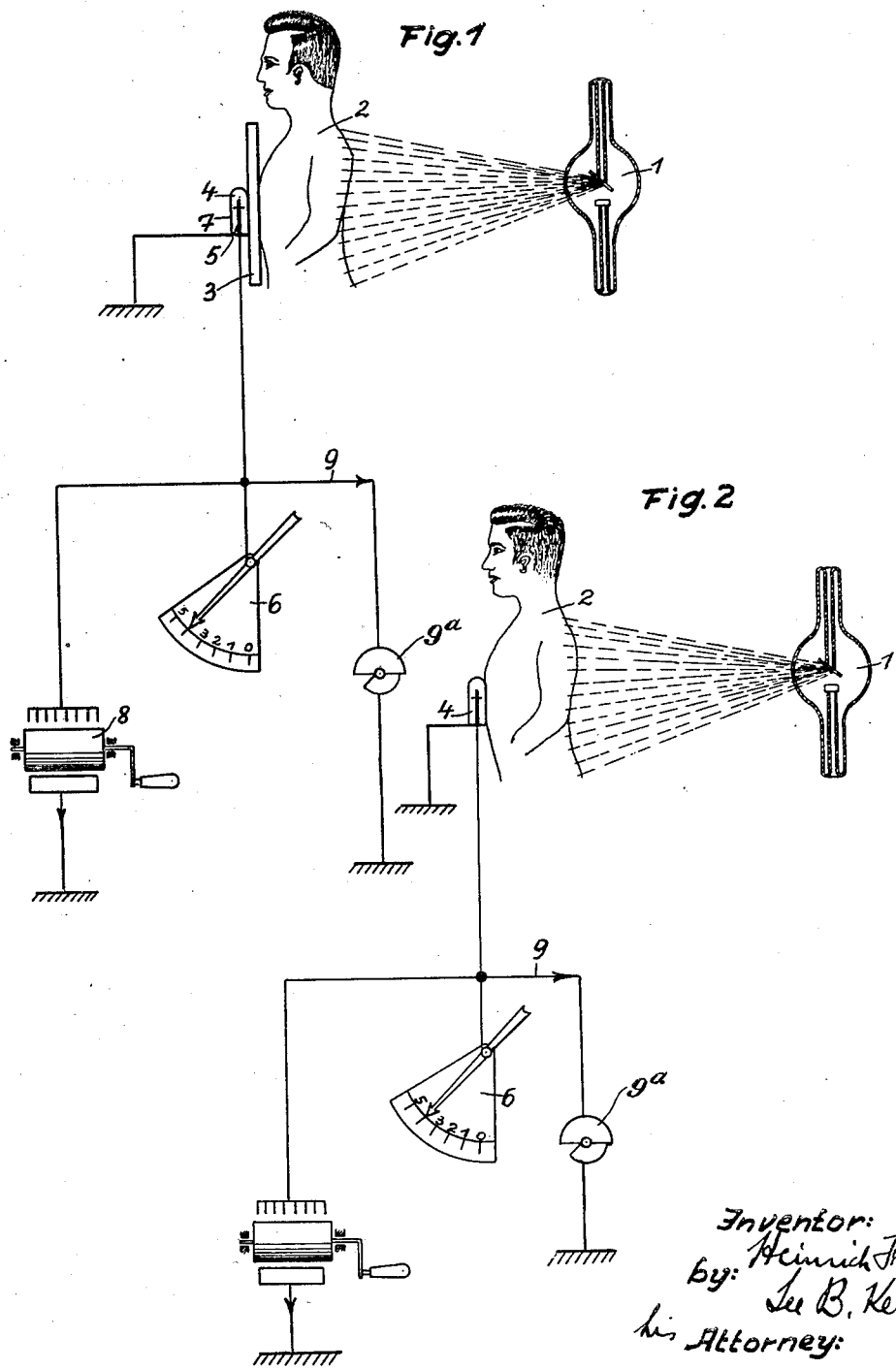

Oct. 30, 1934.     H. FRANKE     1,978,745
METHOD OF AND SYSTEM FOR TAKING X-RAY PHOTOGRAPHS
Filed March 7, 1930     3 Sheets-Sheet 2

Oct. 30, 1934.  H. FRANKE  1,978,745
METHOD OF AND SYSTEM FOR TAKING X-RAY PHOTOGRAPHS
Filed March 7, 1930  3 Sheets-Sheet 3
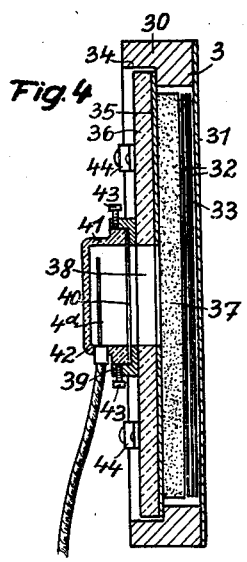
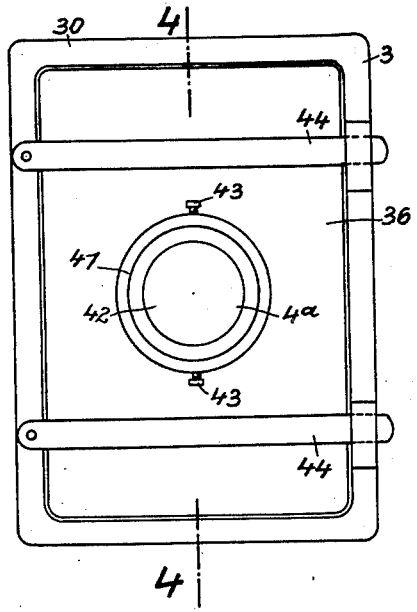
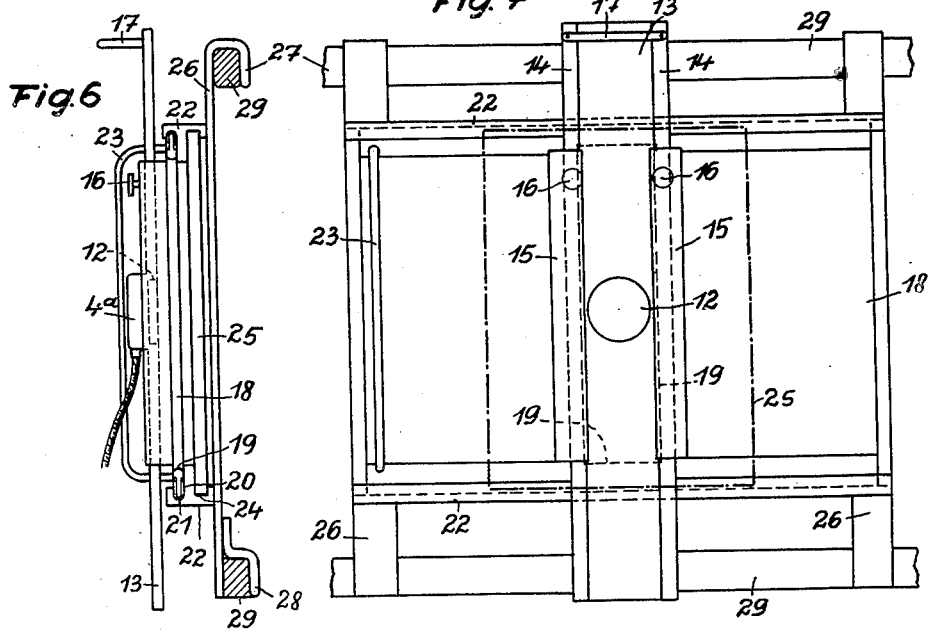
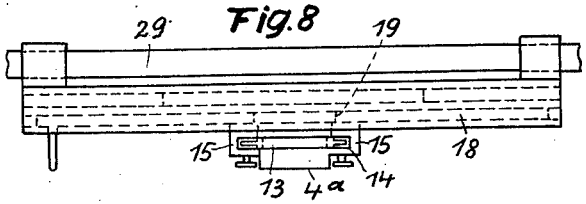

Patented Oct. 30, 1934

1,978,745

UNITED STATES PATENT OFFICE 1,978,745

METHOD OF AND SYSTEM FOR TAKING X-RAY PHOTOGRAPHS

Heinrich Franke, Hamburg-Altona, Germany, assignor to C. H. F. Muller Aktiengesellschaft, Hamburg, Germany, a corporation of Germany Application March 7, 1930, Serial No. 434,025
In Germany March 9, 1929

9 Claims. (Cl. 250—34)

My invention relates to improvements in the method of and system for taking X-ray photographs, and the object of the improvements is to provide a method and a system by means of which the time of the exposure can be exactly controlled so as to obtain the most favorable blackening of the sensitized plate necessary for discovering the state of certain organs of the human body such as the kidneys, the gall-bladder, and the like. With this object in view my invention consists in passing the X-rays through a cell of an ionimetric measuring apparatus or the like which cell is responsive to radiation. This apparatus is provided with means for measuring the intensity of the radiation, the said cell being disposed at the rear of the object being exposed. Thus, by means of the ionimetric measuring apparatus the absorption of the object is eliminated, so that the time of exposure can be correctly ascertained for thick or thin objects, the result being a favorable blackening of the sensitized plate or film.

Figure 3:
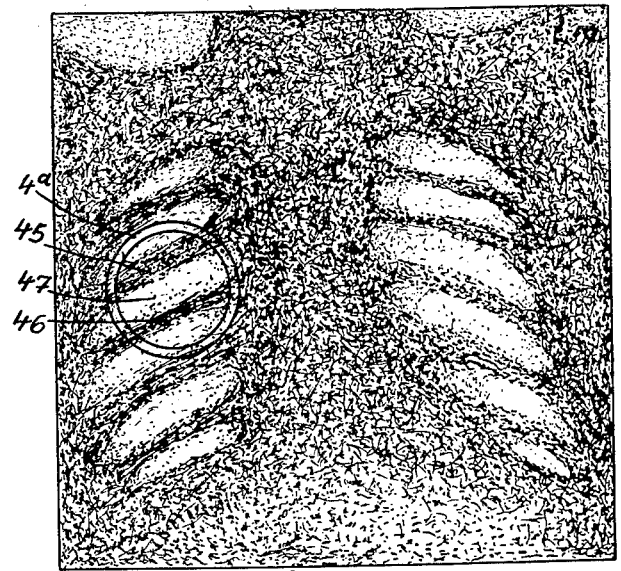
Figure 9:
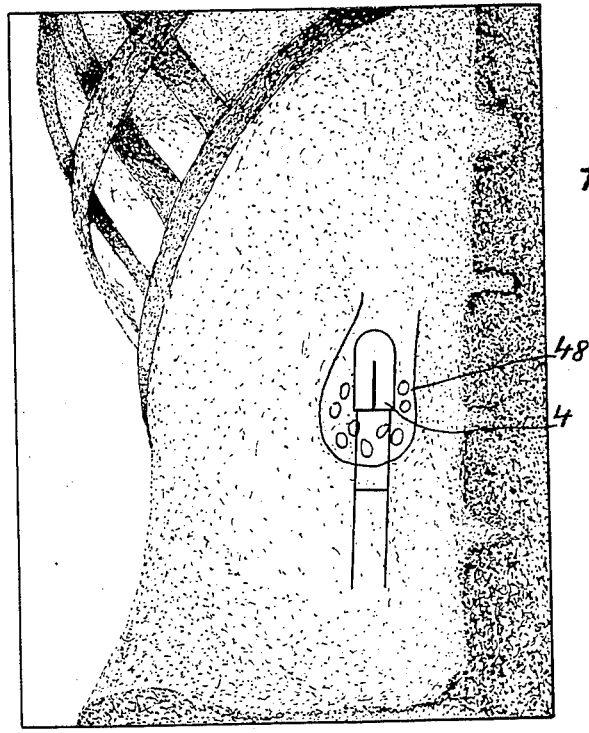

For the purpose of explaining the invention several examples embodying the same have been shown in the accompanying drawings, in which the same letters of reference have been used in all the views to indicate corresponding parts. In said drawings, Fig. 1 is a diagrammatic elevation showing my improved system and the manner of using the same, Fig. 2 is a similar elevation in which the cassette and the sensitized film or plate contained therein are omitted, Fig. 3 is a diagrammatic elevation illustrating the exposure of the lungs in connection with an ionimetric measuring device comprising a cell in the form of a capsule, Fig. 4 is a sectional elevation taken on the line 4—4 of Fig. 5 and illustrating a film cassette provided with a cell in the form of a capsule, Fig. 5 is an elevation of the said cassette and capsule, Fig. 6 is an elevation showing a film cassette, a cell in the form of a capsule and means for adjusting the said cell, Fig. 7 is an elevation looking from the left in Fig. 6, Fig. 8 is a top plan view of Fig. 7, and Fig. 9 is an elevation showing the exposure of the gall-bladders and a cell in the form of a thimble.

In the example shown in Fig. 1 the improved system comprises an X-ray tube 1, a cassette 3 containing a sensitized film or plate and an ionimetric measuring apparatus comprising a cell 4 responsive to radiation, a suitable source of electric energy such as an electro-static machine 8, an electrometer 6, and an adjustable capacity such as a rotary condenser 9a, the electro-static machine 8, the electrometer 6 and the capacity being connected each with one terminal to the electrode 5 of the cell 4. By means of the electrostatic machine a negative charge is transmitted to the insulated electrode 5 of the cell, and the voltage of the said charge is measured by means of the electrometer 6. The other electrode 7 provided by the jacket of the cell and the other terminals of the electro-static machine and the condenser are grounded. In the example shown in Fig. 1 the cell 4 is in the form of a thimble. When using the system in the manner shown in Fig. 1 the sensitized plate contained within the cassette 3 is placed between the cell 4 and the object 2. Therefore the rays emanating from the hot cathode X-ray tube 1 pass first through the object 2, thereafter through the cassette 3 and the sensitized film or plate, and finally through the cell 4. Thus the air confined within the cell is ionized, and an amount of electric energy corresponding to the intensity of the radiation flows from the charged electrode 5 to the grounded electrode 7, so that the voltage indicated by the electrometer 6 is reduced in accordance with the said amount of electricity and the capacity of the system. Therefore, for a certain ionization chamber and constant capacity the reduction of the voltage indicated by the electrometer directly indicates the energy of the radiation passing through the ionization chamber, and therefore the degree of blackening of the plate determined by the energy of the radiation. The said ratio of sensitiveness may be corrected for by varying the capacity by means of the condenser 9a. When using the ionimetric measuring system shown in Fig. 1, at first a plate of the set to be used is exposed to calibrate the electrometer with regard to the set of plates, for which purpose the cell 4 is placed at the rear of the said plate, and by experiment the position of the hand of the electrometer 6 is ascertained which corresponds to the best blackening of the plate. The hand of the electrometer may now coincide with the scale mark 4.

When now making the exposure as is shown in Fig. 1, the cell 4 is placed at the rear of the object and at the rear of the sensitized film or plate contained within the cassette 3. After switching in the apparatus the movement of the hand of the electrometer 6 is observed, and the exposure is interrupted when the hand has moved through the extent previously ascertained by the preliminary measurement of calibrating the type of plates, that is, when the hand has arrived on the scale mark 4. Therefore the electrometer 6 indicates when the exposure must be interrupted for obtaining the most favorable blackening of the plate.

If it is not desired to use the ionimetric measuring apparatus during the exposure, a plate of the character to be used is first calibrated in the manner described above, and the cell 4 is placed at the rear of the object 2 and exposed for a certain period of time, say one second, as is indicated in Fig. 2. Now the hand of the electrometer 6 arrives for example on the scale mark 2. Now the cell 4 is removed, and the cassette is placed at the rear of the object. Since the calibration of the plate corresponds to the scale mark 4, now a dose of rays must be sent through the object which would move the hand on the scale mark 4, and the said dose corresponds to a period of two seconds. Therefore the plate is now exposed two seconds which may be measured by means of a watch. Also in this case the correct blackening of the plate or film is obtained.

By means of the method described above a good median blackening of the plate can be obtained.

In Fig. 3 I have illustrated the manner of making an exposure of the lungs which are to be examined on a screen of known type. It may be assumed that it is desired to obtain the best possible median blackening for the zone of the object comprising the ribs 45 and 46 and the intercostal space 47. In this case the ionimetric measuring system is equipped with a cell 4a in the form of a capsule and of a sufficient size, the said cell being large enough to cover the ribs 45, 46 and the space 47. The cell is first localized by means of a radiation screen.

Now the screen is removed and a cassette containing a sensitized film or plate and provided with the cell 4a is brought in position at the rear of the object. Now the rays are directed through the object, whereby the cell 4a is affected in the manner described above. When the hand of the electrometer arrives in the predetermined position the illumination is interrupted, whereupon the plate has received the desired median blackening.

In Figs. 4 and 5 I have illustrated the construction of a cassette 3 suitable for use in the system illustrated in Fig. 3.

The cassette 3 comprises a rectangular frame 30 made from brass or the like and covered at the side from whence the X-rays pass into the same by a thin plate 31 of aluminium or similar material permitting the passage of X-rays therethrough. At the rear of the plate 31 there are intensifying foils 32, and between the same is sensitized film 33. The frame 30 is provided with a rectangular opening 34 adapted to have a covering plate 35 made from any suitable metal passed into the same. The said covering plate is covered at its rear side by a plate 36 of lead or another material adapted to prevent the passage of X-rays therethrough. At the inner side the plate 35 is provided with a coating of felt 37 adapted to hold the intensifying foils 32 and the film 33 in the proper positions.

At their middle the plates 35 and 36 are provided with a circular window 38, and at the outside of the plate 36 there is a metal flange 39 surrounding the window 38. Within the said flange is arranged the cell 4a which is responsive to radiation, and which in the example shown in Figs. 4 and 5 is in the form of a capsule. At its inner side the said cell is closed by a thin plate 40 of aluminium or the like adapted to permit the passage of rays therethrough. The side wall 41 and the rear wall 42 of the capsule 4a are made from lead or another suitable material preventing the passage of X-rays. The cell 4a is fixed within the flange 39 by means of screws 43 so that it can be readily removed. The covering plate 35 is held within the frame 30 by means of leaf springs 44 common in photographic boxes, and the said leaf springs are fixed to the lead covering 36.

By coating the covering plate 35 with a plate 36 of lead and by manufacturing the parts 41 and 42 of the capsule from lead, foreign rays are prevented from acting on the film 33 and producing shades on the image.

If it is desired to use an adjustable cell I make use of the system illustrated in Figs. 6 to 8.

The cell 4a the capsule of which is likewise coated at its outer side by a covering of lead is constructed so as to fit in a window 12 of a slide 13 made from lead, and it can be readily removed from the said window. At its vertical longitudinal sides the slide 13 is lined by U-shaped strips 14 of sheet metal bent around the margins of the slide. By means of the said sheet metal strips the slide 13 is vertically shiftable in two guide ways 15 of U-shaped cross-section, and the slide 13 is adapted to be fixed in position within the said guide ways by means of screws 16. For facilitating upward and downward movement of the slide 13 a handle 17 is provided on the slide.

The guide ways 15 for the vertically shiftable slide 13 are provided on a slide 18 made from lead and provided at its middle with a vertical window 19. At the horizontal longitudinal edges the slide 18 is lined by U-shaped sheet metal strips 20 by means of which it is horizontally shiftable in longitudinal grooves 21 of two guide ways 22 having T-shaped cross-section. The slide 18 is provided with a handle 23 for more conveniently operating the same.

Further, the guide ways 22 are equipped with longitudinal grooves 24 adapted to have either an illuminating screen or a cassette 25 passed into the same from the side. The guide ways 22 are provided with vertical rods 26 adapted to be mounted by means of hook-shaped parts 27 and 28 on transverse rods 29 of the main frame of the Röntgen system.

The guide ways 15 and 22 may be provided with scale marks cooperating with hands provided on the slides 13 and 18. The said scale marks and hands have not been shown in the figures. By means of the said scale marks and hands the different positions of the window 12 can be ascertained.

The system shown in Figs. 6 to 8 may be used for example for positioning the cell in connection with an illuminating screen, as has been referred to above, if when exposing a plurality of objects each object receives the best possible portion of the blackening corresponding to a median aggregate blackening.

Further, the system shown in Figs. 6 to 8 may be used if it is desired to move the cell during the exposure for the purpose of obtaining a median blackening of the plate.

Further, the system shown in Figs. 6 to 8 may be used for insuring the best blackening for a certain portion of the object.

In Fig. 9 I have illustrated the exposure of a filled gall-bladder. At first an illuminating screen of the well known type is inserted into the grooves 24 (Fig. 6) of the guide ways 22 which have not been shown in Fig. 9. Now the attendant may set the window for the cell in the position in which the gall-bladder is visible by means of the slides 13, 18 (not shown in Fig. 9). Now the attendant retracts the screen from the grooves 24 and places the box in position, and thereafter he fits the cell 4 of the ionimetric measuring apparatus in the window of the slide 13 described above, the shape of the said window being adapted to the shape of the cell 4. In this case the cell is in the form of a thimble. Finally the exposure is made, and when the hand of the electrometer arrives in the proper position the exposure is interrupted. Thus for the part of the plate receiving the image of the bladder the most favorable blackening is insured.

By using slides 13 and 18 made from lead and a cell 4a provided with a lead capsule the production of shades on the plate by foreign rays is prevented.

In lieu of an ionimetric measuring system showing an ion discharge a measuring apparatus may be used which is based on pure electron discharge.

By means of the systems described above I am enabled simultaneously to take photographs of different objects of different thickness and density, and therefore of different absorption powers, the method being carried out so that for each object the most favorable conditions of the exposure are insured. For this purpose the cell responsive to radiation of the ionimetric measuring apparatus is constructed and mounted so that when simultaneously exposing a plurality of objects of different absorption properties it is affected by the X-rays passing through a plurality of the said objects. In this case each object receives the best proportion of blackening according to a median aggregate blackening.

In the method described with reference to Fig. 3 the size of the cell is such that it covers a plurality of objects to be exposed. By means of the system described with reference to Figs. 6 to 8 a comparatively small cell may be used which is acted upon by the rays passing through one of the objects, the cell being mounted so that it is movable through the field of radiation, so that during an exposure it is exposed to the rays passing through the different objects.

By providing the cell at the rear of the sensitized plate the rear wall of the cassette containing the said plate must be permeable at the part where the cell is mounted. When using an ordinary cassette there is the possibility of foreign rays acting on the plate and causing shades thereon. By covering the rear wall of the cassette and the rear and side walls of the cell with lead or the like the admission of such foreign rays is prevented.

Where the cell is provided in a window of a setting device, the said setting device and the rear part of the cell are likewise protected by a covering of lead.

I claim:

1. The method of taking X-ray photographs of an object comprising the steps of exposing a test plate to determine the exposure corresponding to the most favorable blackening of the plate, thereafter directing the X-rays in succession through the object, a sensitized plate and a charged member of a measuring device, the charge of said member being influenced by the X-rays at a rate depending upon the absorption of said object, and regulating the time of exposure in making the photograph in accordance with the indication of said measuring device as calibrated by the exposure of the test plate.

2. The method as claimed in claim 1, in which the period of exposure is interrupted when said measuring device indicates a predetermined value corresponding to a predetermined charge on the member which is influenced by the X-rays.

3. The method of taking X-ray photographs of an object comprising the steps of exposing a test plate to determine the exposure corresponding to the most favorable blackening of the plate, thereafter directing the X-rays in succession through the object and a charged member of a measuring device, the charge of said member being influenced by the X-rays at a rate depending upon the absorption of said object, measuring the time required for a predetermined change in the charge of said member corresponding to that obtained in the exposure of the test plate, and thereafter making the X-ray photograph of said object by a predetermined exposure dependent upon the time required for said predetermined change in the charge of said member.

4. A system for taking X-ray photographs comprising a source of X-rays, a support for a sensitized plate or film, an apparatus for measuring the intensity of radiation and comprising a cell mounted on said support behind said plate or film and responsive to radiation from said source of X-rays passing through the plate or film, and means connected with said cell and measuring the intensity of the radiation.

5. A system for taking X-ray photographs comprising a source of X-rays, a support for a sensitized plate or film, an apparatus for measuring the intensity of radiation and comprising a cell mounted on said support behind the plate or film and responsive to radiation from said source of X-rays passing through the plate or film, and means connected with said cell for measuring the intensity of the radiation, said cell being of such size as to cover a considerable portion of said plate or film so that when a plurality of objects of different absorption are exposed to radiation the rays passing through said objects pass through the cell.

6. A system for taking X-ray photographs comprising a source of X-rays, a support for a sensitized plate or film, an apparatus for measuring the intensity of radiation and comprising a cell movably mounted on said support behind said plate or film and responsive to the radiation from said source of X-rays passing through the plate or film, means connected with said cell for measuring the intensity of the radiation and means for shifting said cell during the exposure to positions behind different areas of said plate or film.

7. In a system for taking X-ray photographs, a cassette for a sensitized carrier having a window formed in its rear wall, and a cell responsive to radiation mounted in said window.

8. In a system for taking X-ray photographs, a cassette for a sensitized carrier having a window formed in its rear wall, and shiftable means connected with said window for mounting a cell responsive to radiation therein.

9. In a system for taking X-ray photographs, a cassette for a sensitized carrier having a rear wall impermeable to X-rays and formed with a window, and a cell responsive to radiation mounted on said cassette at the rear of said window and having its rear and side walls impermeable to X-rays.

HEINRICH FRANKE.